(12) United States Patent
Hu et al.

(10) Patent No.: US 12,180,236 B2
(45) Date of Patent: Dec. 31, 2024

(54) HYDROXIMIC ACID-METAL HYDROXIDE COORDINATION COMPLEX AND PREPARATION AND APPLICATION THEREOF

(71) Applicant: CENTRAL SOUTH UNIVERSITY, Changsha (CN)

(72) Inventors: Yuehua Hu, Changsha (CN); Wei Sun, Changsha (CN); Haisheng Han, Changsha (CN); Zhao Wei, Changsha (CN); Jianjun Wang, Changsha (CN); Ruolin Wang, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 909 days.

(21) Appl. No.: 17/270,961

(22) PCT Filed: Aug. 29, 2018

(86) PCT No.: PCT/CN2018/102839
§ 371 (c)(1),
(2) Date: Feb. 24, 2021

(87) PCT Pub. No.: WO2020/041991
PCT Pub. Date: Mar. 5, 2020

(65) Prior Publication Data
US 2021/0253620 A1    Aug. 19, 2021

(51) Int. Cl.
*C07F 15/02* (2006.01)
*B03D 1/008* (2006.01)
(Continued)

(52) U.S. Cl.
CPC ............ *C07F 15/025* (2013.01); *B03D 1/008* (2013.01); *B03D 1/01* (2013.01); *C01G 19/02* (2013.01); *C01G 23/0475* (2013.01); *C01G 41/02* (2013.01); *C07F 7/2224* (2013.01); *C07F 7/28* (2013.01); *C07F 11/005* (2013.01); *B03D 2201/02* (2013.01)

(58) Field of Classification Search
None
See application file for complete search history.

(56) References Cited

FOREIGN PATENT DOCUMENTS

| CN | 103012677 A | 4/2013 |
|---|---|---|
| CN | 105618272 A | 6/2016 |

OTHER PUBLICATIONS

Machine translation of CN 105618272 (Year: 2016).*
(Continued)

*Primary Examiner* — Peter Keyworth
(74) *Attorney, Agent, or Firm* — Bayramoglu Law Offices LLC (57) ABSTRACT

A hydroxamic acid-metal hydroxide coordination complex and preparation and application thereof are disclosed. The hydroxamic acid-metal hydroxide coordination complex is formed by a coordination of hydroxamic acid with divalent or higher valent metal ions under an alkaline condition. The hydroxamic acid-metal hydroxide coordination complex has a strong selectivity and a strong collection ability for metal oxide minerals such as tungsten-containing minerals, ilmenite, rutile, cassiterite, and rare earth. The preparation method is simple and low in costs, and is beneficial to industrialized production.

15 Claims, 8 Drawing Sheets

(51) Int. Cl.
 B03D 1/01 (2006.01)
 C01G 19/02 (2006.01)
 C01G 23/047 (2006.01)
 C01G 41/02 (2006.01)
 C07F 7/22 (2006.01)
 C07F 7/28 (2006.01)
 C07F 11/00 (2006.01)

(56) References Cited

OTHER PUBLICATIONS

Yuehua Hu, et al., The application of Metal-coordinated Complexes in the Flotation of Oxide Minerals and Fundamental Research of the Adsorption Mechanism, Conservation and Utalization of Mineral Resources, 2018, pp. 42-53, No. 1.

Yue-Sheng Gao, et al., Research progress of influence of metal ions on mineral flotation behavior and underlying mechanism, The Chinese Journal of Nonferrous Metals, 2017, pp. 859-868, vol. 27 No. 4.

Jianjun Wang, et al., The Synthesis and Photoacoustics of Rare Earth Complexes of Benohydroxamic Acid, Journal of Nanjing University (Natural Sciences Edition), 1988, pp. 737-742, vol. 24 No. 4.

George M. Iskander, et al., Synthesis and Copolymerization of Methacryloyl Hydroxamic Acids, Journal of Applied Polymer Science, 2000, pp. 751-758, vol. 78.

* cited by examiner

HYDROXIMIC ACID-METAL HYDROXIDE COORDINATION COMPLEX AND PREPARATION AND APPLICATION THEREOF

CROSS REFERENCE TO THE RELATED APPLICATIONS

This application is the national stage entry of International Application No. PCT/CN2018/102839, filed on Aug. 29, 2018.

TECHNICAL FIELD

The present invention relates to an organic metal hydroxide coordination complex, more particularly, to a hydroxamic acid-metal hydroxide coordination complex and preparation and separation purification methods thereof, and application of the hydroxamic acid-metal hydroxide coordination complex as a floatation collector of tungsten-containing ore, tin ore, titanium ore or rare earth ore, etc., and belongs to the technical field of mineral separation.

BACKGROUND

Mineral resources are basic materials of national economy and are related to the long-term stable development of national economy and national security. The efficient development and utilization of mineral resources have been included in the national medium and long-term planning outline for science and technology development. Oxide ore, as main minerals of metals such as tungsten, tin, iron, manganese, lead, zinc, copper, and titanium, plays an important role in development and utilization of the mineral resources. Compared with sulfide ore, the oxide ore has a more complicated symbiosis relationship, high separation difficulty and low utilization rate. With the intensification of resource leanness and fineness, the separation difficulty is further increased, and higher requirements are put forward for the selectivity in a mineral separation process. Tungsten ore, cassiterite, and rutile which are typical representatives of oxide mineral resources face a series of common scientific problems in efficient comprehensive utilization of resources, such as the characteristics of "leanness, fineness and miscellaneousness" of resources and the key problems such as insufficient selectivity of a collector in a floatation process.

China is rich in tungsten resources, but more than 70% of the resources belong to difficult-to-treat resources. The reserves of Luanchuan associated ultra-low-grade tungsten resources alone reach 620 thousand tons. Due to lack of effective technical measures, massive tungsten resources were lost in tailings. The reserves of typical skarn type high-calcium wolframite and scheelite associated resources in Shizhuyuan and Xingluokeng are up to 1.3 million tons. With the reduction of the grade and the increase of calcium-containing gangue, the comprehensive utilization of this kind of resources is more difficult. The tungsten recovery rate in the Shizhuyuan was once reduced to about 63%. Scheelite, calcite, and fluorite all belong to soluble salt minerals, the solubility is relatively high, and there is a mutual conversion phenomenon between calcium-containing minerals, making the floatation of each mineral more complicated, and the separation between the calcium-containing minerals more difficult. The essence of the resource utilization problem is a separation problem of scheelite (calcium-containing useful minerals) from calcium-containing gangue minerals, which is a worldwide problem. The selectivity of floatation agents is the key to efficient development of this kind of resources.

China is one of countries with most abundant tin ore resources in the world, and its reserves account for 28.85% of the world's proven reserves. However, tin resources in China are characterized by complicated common associated ingredients, and more than 80% of the resources are common associated resources. With the decrease of the grade of cassiterite raw ore and the increase of difficult-to-float pyrrhotite and gangue minerals with similar density, the treatment difficulty of micro-fine cassiterite increases, and the floatation separation of complicated multi-metal micro-fine cassiterite becomes a difficult problem in the field of mineral separation. By taking Shizhuyuan tungsten-tin-molybdenum-bismuth multi-metal ore in Hunan as an example, the proven reserves of tin are up to 460 thousand tons. Because the grade of associated tin in the raw ore only ranges from 0.1% to 0.12%, and 60% of the associated tin is colloidal tin minerals, which was once determined, by relevant experts, to be tin minerals which cannot be recovered at all. At present, the ore embedding granularity is fine, the common associated relationship is complicated, the grade is relatively low, the floatability is poor, and the comprehensive utilization difficulty is high. The comprehensive recovery of tin resources has not been accomplished yet. With the amount of tin metal discharged to the tailing pond reaching 1.5 thousand tons each year, the comprehensive recovery of low-grade associated tin resources faces great challenges.

The essential reason for low comprehensive utilization rate of the resources is that collectors of oxide ores such as tungsten ore, cassiterite, and rutile are mainly anionic collectors such as fatty acid and chelating collectors. These collectors realize the collection on target minerals through the action of organic acid functional groups containing N, O, P and the like with active sites on surfaces of minerals. However, useful minerals in an oxide ore system have similar surface chemical properties to the gangue minerals, and these conventional anionic collectors are difficult to realize qualitative improvement in selectivity. For example: scheelite, fluorite, and calcite are all calcium-containing minerals, and the traditional collector simultaneously acts with the surfaces of the minerals through calcareous points, resulting in poor selectivity. Massive metal ions such as copper, iron, lead, and calcium in the cassiterite floatation system are adsorbed on the surfaces of the minerals, making the cassiterite and the gangue minerals have similar surface properties, and making it difficult for the traditional anionic collector to realize efficient selective adsorption, resulting in low resource utilization rate, high energy consumption and high cost in a production process, and prominent environmental problems in mineral separation. The rutile is similar in structures and surface properties to silicate minerals (such as epidote and hornblende), but the fine-graded rutile resources have not been effectively exploited. Therefore, developing new oxide ore collectors with high selective collection ability has become an important research direction of mineral separation workers.

In recent years, metal ion coordination regulating and control molecular assembly has become a research hotspot in the fields of chemical industry, materials, biology, medicine and the like. Massive coordination polymers with novel and diversified structures and various functions have been designed and developed to resolve a series of key problems in various fields. Coordination collectors with specific collection ability are formed through coordination assembly of metal ions and ligands, or micelles with specific structures are formed through coordination regulation and control of metal ions, so that a new idea is provided for development of novel floatation agents. For example, the Chinese patent (CN105618272A) discloses a metal ion coordination complex collector formed by coordination of a ligand with metal ions. A preparation method thereof includes adding a ligand-containing solution into soluble metal salts for reaction to obtain a metal ion coordination complex collector. The metal ion coordination complex collector has strong selective collection ability for tungsten-containing minerals, rare earth, cassiterite and the like, can realize selective separation of tungsten-containing minerals, cassiterite, rare earth and the like from calcium-containing gangue minerals under the condition of no calcium-containing mineral inhibitor, and fundamentally resolves the problem of separation difficulty of the calcium-containing minerals. However, the coordination complex formed by the metal ions and the organic ligand in a solution system is not a single ingredient, and is actually a multi-ingredient mixture, and a part really playing a role in a mineral floatation process is a certain ingredient positively charged on surfaces, so that a content of an effective part of the metal ion coordination complex obtained by the method is low, resulting in low utilization rate, high cost, and relatively poor application effect.

SUMMARY

Technical Problem

In view of the existing problems of a metal hydroxide coordination complex obtained through flotation collection of oxide ores such as tungsten ore, cassiterite, and rutile, the first objective of the present invention is to provide a hydroxamic acid-metal hydroxide coordination complex collector with ultra-strong selectivity and ultra-strong collection ability for tungsten ore, cassiterite, ilmenite, rutile, rare earth, etc. Compared with an existing similar hydroxamic acid metal coordination complex, the hydroxamic acid-metal hydroxide coordination complex collector has a higher content of effective ingredients (the effective ingredients herein refer to parts with collection ability for metal minerals) acting on minerals such as tungsten ore, cassiterite, ilmenite, rutile, and rare earth, and has a more significant collection effect and lower costs.

The second objective of the present invention is to provide a method for preparing the hydroxamic acid-metal hydroxide coordination complex, with advantages of simple flow process, mild reaction condition, and low cost.

The third objective of the present invention is to provide application of the hydroxamic acid-metal hydroxide coordination complex. The hydroxamic acid-metal hydroxide coordination complex is applied to floatation separation of tungsten ore, cassiterite, ilmenite, rutile, and rare earth from gangue minerals such as calcite, fluorite, phosphorite, and aluminosilicate minerals, thereby fundamentally resolving the problems of floatation separation difficulty and low efficiency of complicated low-grade oxide ore and greatly reducing the use cost.

Solution to Problems

Technical Solution

In order to achieve the above technical objectives, the present invention provides a hydroxamic acid-metal hydroxide coordination complex, formed by the coordination of hydroxamic acid with divalent or higher valent metal ions under an alkaline condition.

The hydroxamic acid has a structure of Formula 1:

Formula 1

Where R is a hydrophobic organic group.

As a preferable solution, the hydrophobic organic group in hydroxamic acid refers to that its hydrophile-lipophile balance value is small. Generally, the hydrophile-lipophile balance value is less than 9, and is most preferably less than 6. R is preferably an aliphatic hydrocarbon radical or aryl. The aliphatic hydrocarbon radical may be saturated alkyl chain. The alkyl chain may be linear, branched, or cyclic. The aliphatic hydrocarbon radical may be an unsaturated alkyl chain, for example, including at least one carbon-carbon double bond or at least one carbon-carbon triple bond. Or some common substituent groups such as halogen may be contained on the aliphatic hydrocarbon. The substituent groups are preferably not hydrophilic groups. If the hydrophilic groups are selected, the hydrophile-lipophile balance value of the whole aliphatic hydrocarbon radical should be a small value, for example, the hydrophile-lipophile balance value of less than 6. When R is the aliphatic hydrocarbon radical, a $C_4$-$C_{12}$ alkyl or a $C_4$-$C_{12}$ unsaturated aliphatic hydrocarbon radical is preferable. The aryl is preferably a phenyl or a substituted phenyl. The substituted phenyl refers to that on a benzene ring is contained at least one substituent group, such as short-chain alkyl, halogen and alkoxy. The substituent group is preferably not a hydrophilic group. If a hydrophilic group is selected, the hydrophile-lipophile balance value of the whole substituted phenyl group should be a small value, for example, the hydrophile-lipophile balance value of less than 6. Benzohydroxamic acid has the optimum effect in all hydroxamic acids. R is most preferably a phenyl.

As a preferable solution, the divalent or higher valent metal ions include at least one of $Pb^{2+}$, $Ca^{2+}$, $Mn^{2+}$, $Cu^{2+}$, $Fe^{3+}$, and $Al^{3+}$. It is shown by a large number of experiments that in the hydroxamic acid-metal hydroxide coordination complex prepared from different metal ions under the same condition, a hydroxamic acid-lead coordination complex formed by divalent lead ions shows better selectivity and strong collection ability in floatation collection on minerals such as tungsten ore, cassiterite, ilmenite, rutile, and rare earth than a hydroxamic acid-metal hydroxide coordination complex formed by other metal ions such as $Ca^{2+}$, $Mn^{2+}$, $Cu^{2+}$, $Fe^{3+}$, and $Al^{3+}$. As $Pb^{2+}$ is better than $Ca^{2+}$, $Ca^{2+}$ is better than $Mn^{2+}$, $Fe^{3+}$, and $Al^{3+}$, and $Mn^{2+}$, $Fe^{3+}$, and $Al^{3+}$ are better than $Cu^{2+}$, the metal ions are most preferably $Pb^{2+}$.

As a preferable solution, a coordination mole ratio of the divalent or higher valent metal ions to the hydroxamic acid is (1-4):(1-5). The coordination mole ratio is more preferably (1-2):(1-3). Under different ratios, different hydroxamic acid-metal hydroxide coordination complexes with drastically different structures and properties can be formed by the metal ions and the hydroxamic acid. In a ratio range, the hydroxamic acid-metal hydroxide coordination complex with a highest content of effective ingredients (the effective ingredients herein refer to parts with collection ability for metal minerals) can be formed, and influence may be caused, by both too high and too low ratios, on the content of effective ingredients and the adsorption performance of the effective ingredients on surfaces of minerals.

As a preferable solution, a pH value of the alkaline condition is 8-11, and is more preferably 8.5-9.5. Under the alkaline condition, parts of hydroxyl may participate in the coordination and coordinate metal ions together with the hydroxamic acid to produce a hydroxamic acid/hydroxyl-metal hydroxide coordination complex. If the pH value is too low, effective participation in the reaction is difficult for the hydroxyl. If the pH value is too high, a great number of hydroxyls compete with ligands and form hydroxide precipitates, making it difficult to forma coordination complex.

The present invention further provides a preparation method of a hydroxamic acid-metal hydroxide coordination complex. The hydroxamic acid-metal hydroxide coordination complex is obtained through coordination reaction of hydroxamic acid with divalent or higher valent metal ions in an alkaline solution system.

The hydroxamic acid has a structure of Formula 1:

Formula 1 where R is a hydrophobic organic group.

As a preferable solution, R is an aliphatic hydrocarbon radical or an aryl. R is preferably a $C_4$-$C_{12}$alkyl, $C_4$-$C_{12}$unsaturated aliphatic hydrocarbon radical, phenyl, and substituted phenyl. R is most preferably a phenyl.

As a preferable solution, the divalent or higher valent metal ions include at least one of $Pb^{2+}$, $Ca^{2+}$, $Mn^{2+}$, $Cu^{2+}$, $Fe^{3+}$, and $Al^{3+}$. The divalent metal ions are preferably $Pb^{2+}$.

As a preferable solution, a coordination mole ratio of the divalent or higher valent metal ions to the hydroxamic acid is (1-4):(1-5). The coordination mole ratio is more preferably (1-2):(1-3).

As a preferable solution, a pH value of the alkaline condition is 8-11, and is more preferably 8.5-9.5. An alkaline solution may be regulated by common alkalis such as sodium hydroxide and potassium hydroxide.

As a preferable solution, a temperature of the coordination reaction is 20-80° C., and a reaction time is 0.5-6 h. A temperature of the coordination reaction is more preferably 55-65° C., and a reaction time is more preferably 1-2 h. More preferable coordination reaction conditions include: a temperature of 55-65° C. and a reaction time of 1-2 h. The reaction temperature influences a reaction speed and a structure of a formed coordination complex. If the temperature is too low, the reaction speed is low, and the conversion rate is low. If the reaction temperature is too high, a great number of non-hydroxyl coordination complexes may be formed.

As a preferable solution, after the coordination reaction is completed, the hydroxamic acid-metal hydroxide coordination complex is separated and purified by a carrier adsorption-foam floatation method.

As a preferable solution, the carrier adsorption-foam floatation method includes: adsorbing the hydroxamic acid-metal hydroxide coordination complex in a solution system by carrier particles; after adsorption is completed, recovering the carrier particles loading the hydroxamic acid-metal hydroxide coordination complex through foam floatation; and obtaining a hydroxamic acid-metal hydroxide coordination complex solution by ultrasonic washing of the carrier particles loading the hydroxamic acid-metal hydroxide coordination complex. The carrier particles are added into the solution system. The hydroxamic acid-metal hydroxide coordination complex is adsorbed onto surfaces of the carrier particles through electrostatic interaction and covers the carrier particles, so that the surfaces of the carrier particles show strong hydrophobic properties. Through inflation floatation, the carrier particles adsorbing the hydroxamic acid-metal hydroxide coordination complex on the surface enter a foam layer. The hydroxamic acid-metal hydroxide coordination complex with high purity can be obtained through separation by a carrier adsorption-foam floatation method.

As a preferable solution, carrier particles are quartz particles with a particle size of 10-37 μm. The particle size of the quartz particles is 10-37 μm, so that upward floatation of particles in a subsequent floatation process is facilitated. The relative addition amount of the quartz particles in the system is not less than 100 g/L, so as to ensure the sufficient separation and recovery of the hydroxamic acid-metal hydroxide coordination complex.

As a preferable solution, absolute ethyl alcohol is used as a washing agent for ultrasonic washing. Theoretically, any solvent capable of dissolving and dispersing the benzohydroxamic acid-metal hydroxide coordination complex may be used as the washing agent. The cheap, safe, and nontoxic ethyl alcohol is preferably used as the washing agent.

As a preferable solution, metal ions are mainly provided by a water-soluble metal salt solution, such as nitrate. There is no special requirement on a concentration of the metal ions.

As a preferable solution, the hydroxamic acid is mainly dissolved by an organic solvent, such as ethyl alcohol. There is no special requirement on the concentration of the hydroxamic acid.

The present invention further provides application of a hydroxamic acid-metal hydroxide coordination complex. The hydroxamic acid-metal hydroxide coordination complex is used as a floatation collector to be applied to floatation separation of metal oxide minerals containing at least one of tungsten, tin, titanium, and rare earth from gangue minerals.

As a preferable solution, the tungsten-containing metal minerals include at least one of scheelite, wolframite, and tungstite.

As a preferable solution, the tin-containing minerals include cassiterite.

As a preferable solution, the titanium-containing minerals include ilmenite and/or rutile.

As a preferable solution, the gangue minerals include at least one of calcite, fluorite, phosphorite, quartz, and aluminosilicate minerals.

As a preferable solution, a pulp system in a floatation separation process is an alkaline environment. A pH value is preferably 8-11.

A preparation method of a hydroxamic acid-metal hydroxide coordination complex of the present invention specifically includes the following steps:

Step I, synthesis of the hydroxamic acid-metal hydroxide coordination complex:

respectively preparing a hydroxamic acid ethyl alcohol solution and a metal salt water solution, adding sodium hydroxide into the hydroxamic acid solution to regulate the pH value to be 8.5-9.5, heating the hydroxamic acid solution to 55-65° C., slowly adding the metal salt solution into the hydroxamic acid solution for reaction for 1-2 h at a mole ratio of metal salts to hydroxamic acid of (1-2):(1-3);

Step II, floatation separation of quartz carriers:

transferring the hydroxamic acid-metal hydroxide coordination complex obtained in step I into a floatation cell, adding 10-37 μm of quartz powder, performing pulp conditioning and stirring for 10-30 min, then, performing inflation floatation, collecting floatation foam, and performing filtration; and Step III, desorption of the hydroxamic acid-metal hydroxide coordination complex:

putting a quartz product obtained in step II into the ethyl alcohol solution, performing oscillation washing by an ultrasonic washing device so that the hydroxamic acid-metal hydroxide coordination complex adsorbed on the quartz surface is desorbed, and immersing the hydroxamic acid-metal hydroxide coordination complex into the ethyl alcohol solution to obtain a hydroxamic acid-metal hydroxide coordination complex and ethyl alcohol mixed solution capable of being used as a floatation collector.

Floatation enrichment of the hydroxamic acid-metal hydroxide coordination complex of the present invention on tungsten ore, cassiterite, ilmenite, rutile, and rare earth (specific illustration by taking tungsten ore floatation as an example): After the tungsten ore is subjected to crushing, ore grinding, magnetic separation deferrization, and desulfurization, sodium carbonate is added to regulate the pH value of ore pulp. Then, the hydroxamic acid-metal hydroxide coordination complex is added for stirring and pulp conditioning. Terpenic oil is added for inflation floatation. A foam product is a tungsten coarse concentrate. An addition amount of a collector relative to raw ore is 200-500 g/t. A floatation pH value is 7-12. A floatation temperature is 0-90° C.

Figure 1:
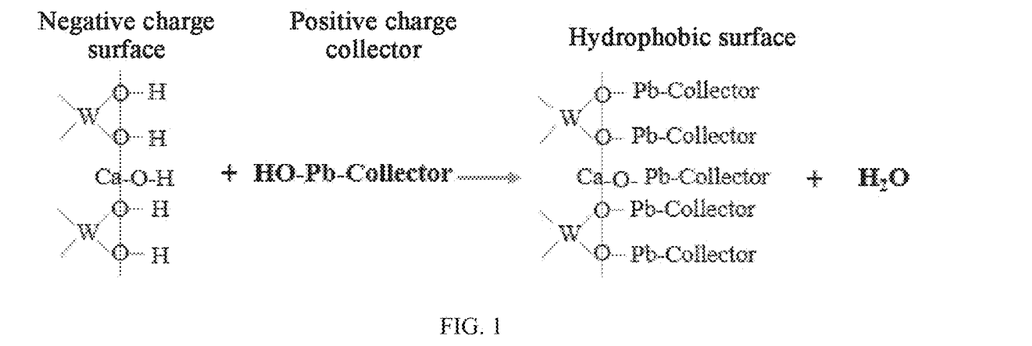
FIG. 1 is a schematic diagram of an adsorption model of floatation collection of scheelite by a benzohydroxamic acid-lead hydroxide coordination complex.

The benzohydroxamic acid-metal hydroxide coordination complex of the present invention has strong selectivity and strong collection ability for minerals such as scheelite, wolframite, ilmenite, rutile, and rare earth. A main reason is that these minerals are negatively charged on surfaces under the alkaline condition. The hydroxamic acid-metal coordination complex has a colloid structure, and is positively charged on the surface. Typical adsorption exists between the minerals and the hydroxamic acid-metal coordination complex, so that the hydroxamic acid-metal coordination complex is very easy to be adsorbed onto the surfaces of the minerals negatively charged on the surfaces through electrostatic interaction. At the same time, the hydroxamic acid-metal hydroxide coordination complex has a hydroxyl structure, is easy to act with active mass points on the surfaces of the minerals, so as to strengthen the adsorption of the hydroxamic acid-metal hydroxide coordination complex on the surface. By taking collection of scheelite by the benzohydroxamic acid-lead coordination complex as an example, its adsorption model is shown in FIG. 1.

Beneficial Effects of the Invention

Beneficial Effects

1. An existing hydroxamic acid-metal hydroxide coordination complex is a metal hydroxide coordination complex system with complicated ingredients, and includes a low content of effective ingredients capable of acting on the surfaces of minerals such as scheelite, wolframite, ilmenite, rutile, and rare earth. In the technical solution of the present invention, the coordination reaction is performed under the alkaline condition, so that the hydroxyl and the hydroxamic acid are used as co-ligands to be coordinated with high valent metal ions to produce the hydroxamic acid-metal hydroxide coordination complex, improving the content of the effective ingredients with collection ability for the minerals such as scheelite, wolframite, ilmenite, rutile, and rare earth is significantly improved, and stronger selectivity and collection ability are shown, so that the use cost of the hydroxamic acid-metal hydroxide coordination complex as a collector is greatly reduced.

2. The hydroxamic acid-metal hydroxide coordination complex of the present invention is simple in a preparation flow process, mild in conditions, and low in cost, and is favorable for industrialized production.

3. The benzohydroxamic acid-metal hydroxide coordination complex of the present invention has very strong selectivity and strong collection ability for metal oxide minerals such as tungsten ore, cassiterite, rutile, ilmenite, and rare earth, can realize efficient floatation enrichment of metal oxide minerals such as tungsten ore, cassiterite, ilmenite, rutile, and rare earth, and is particularly suitable for efficient enrichment of the tungsten-containing minerals, so that an enrichment ratio of the tungsten-containing minerals is as high as 50 times or higher, and a recovery rate is higher than 85%. Favorable conditions are created for a subsequent normal-temperature concentration operation, which replaces the heating concentration operation, thereby achieving efficient connection between the roughing operation and the concentration operation.

4. In the process of using the benzohydroxamic acid-metal hydroxide coordination complex of the present invention as a collector for floatation, the flow process is short, agents are simple, the operation is convenient, the work intensity is low, the energy consumption is low, the environment is protected, the efficiency is high, the cost is greatly reduced, and the utilization rate of metal resources such as tungsten is significantly improved.

5. The benzohydroxamic acid-metal hydroxide coordination complex of the present invention has the advantages of good selective collection effect, stable performance, low consumption, and low cost, and can be widely applied to floatation separation processes of tungsten ore, cassiterite, ilmenite, rutile, rare earth, etc., effectively improving the concentrate quality.

DETAILED DESCRIPTION OF THE EMBODIMENTS

Embodiments below further illustrate contents of the present invention, and are not intended to limit the scope of the present invention claimed to be protected in claims.

In the embodiments below, used agents and ore raw materials, unless otherwise specified, are all common raw materials directly obtained on the market in the art.

Embodiment 1

100 mL of 0.1 mol/L benzohydroxamic acid (BHA) ethyl alcohol solution and 8 mL of 0.5 mol/L lead nitrate solution were respectively prepared. Sodium hydroxide was added into the benzohydroxamic acid solution to regulate a pH value to 9. The solution was heated to 60° C. The lead nitrate solution was slowly added into the benzohydroxamic acid solution. A reaction time was 1.5 h. An obtained benzohydroxamic acid-lead coordination complex solution was transferred into a floatation cell with a volume of 100 mL. 30 g of quartz powder with a particle size of 10-37 μm was added. Pulp conditioning and stirring were performed for 15 min. Then, inflation floatation was performed. Floatation foam was collected, and filtration was performed. Quartz products in the floatation foam were transferred into the ethyl alcohol solution. Oscillation washing was performed by an ultrasonic washing device so that the benzohydroxamic acid-lead hydroxide coordination complex adsorbed on the quartz surface was desorbed. A benzohydroxamic acid-lead hydroxide coordination complex-ethyl alcohol mixed solution was obtained, and might be used as a floatation collector. According to this embodiment, the benzohydroxamic acid-lead hydroxide coordination complex was prepared under a condition of $C_{Pb}/C_{BHA}=1:2.5$.

Embodiment 2

Experiment conditions were identical to those in Embodiment 1. Only proportions of lead nitrate and hydroxamic acid were different: 80 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=4:1$.

Embodiment 3

Experiment conditions were identical to those in Embodiment 1. Only proportions of lead nitrate and hydroxamic acid were different: 40 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=2:1$.

Embodiment 4

Experiment conditions were identical to those in Embodiment 1. Only proportions of lead nitrate and hydroxamic acid were different: 20 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=1:1$.

Embodiment 5

Experiment conditions were identical to those in Embodiment 1. Only proportions of lead nitrate and hydroxamic acid were different: 10 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=1:2$.

Embodiment 6

Experiment conditions were identical to those in Embodiment 1. Only proportions of lead nitrate and hydroxamic acid were different: 5 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=1:4$.

Embodiment 7

Experiment conditions were identical to those in Embodiment 1. Only proportions of lead nitrate and hydroxamic acid were different: 4 mL of 0.5 mol/L lead nitrate solution and 100 mL of 0.1 mol/L benzohydroxamic acid ethyl alcohol solution.

According to this embodiment, the benzohydroxamic acid-lead hydroxide coordination complex was prepared under a condition of $C_{Pb}/C_{BHA}=1:5$.

Embodiment 8

Experiment conditions were identical to those in Embodiment 7. Only metal salt solution containing different metal ions was used: the lead nitrate solution was replaced by a solution containing $Ca^{2+}$, $Mn^{2+}$, $Cu^{2+}$, $Fe^{3+}$ or $Al^{3+}$.

Embodiment 9

Experiment conditions were identical to those in Embodiment 6. Only the benzohydroxamic acid was replaced by salicyl hydroxamic acid.

Embodiment 10

Experiment conditions were identical to those in Embodiment 5. Only the benzohydroxamic acid was replaced by octyl hydroxamic acid.

Embodiment 11

Experiment conditions were identical to those in Embodiment 5. Only the benzohydroxamic acid was replaced by acetohydroxamic acid.

Figure 2:
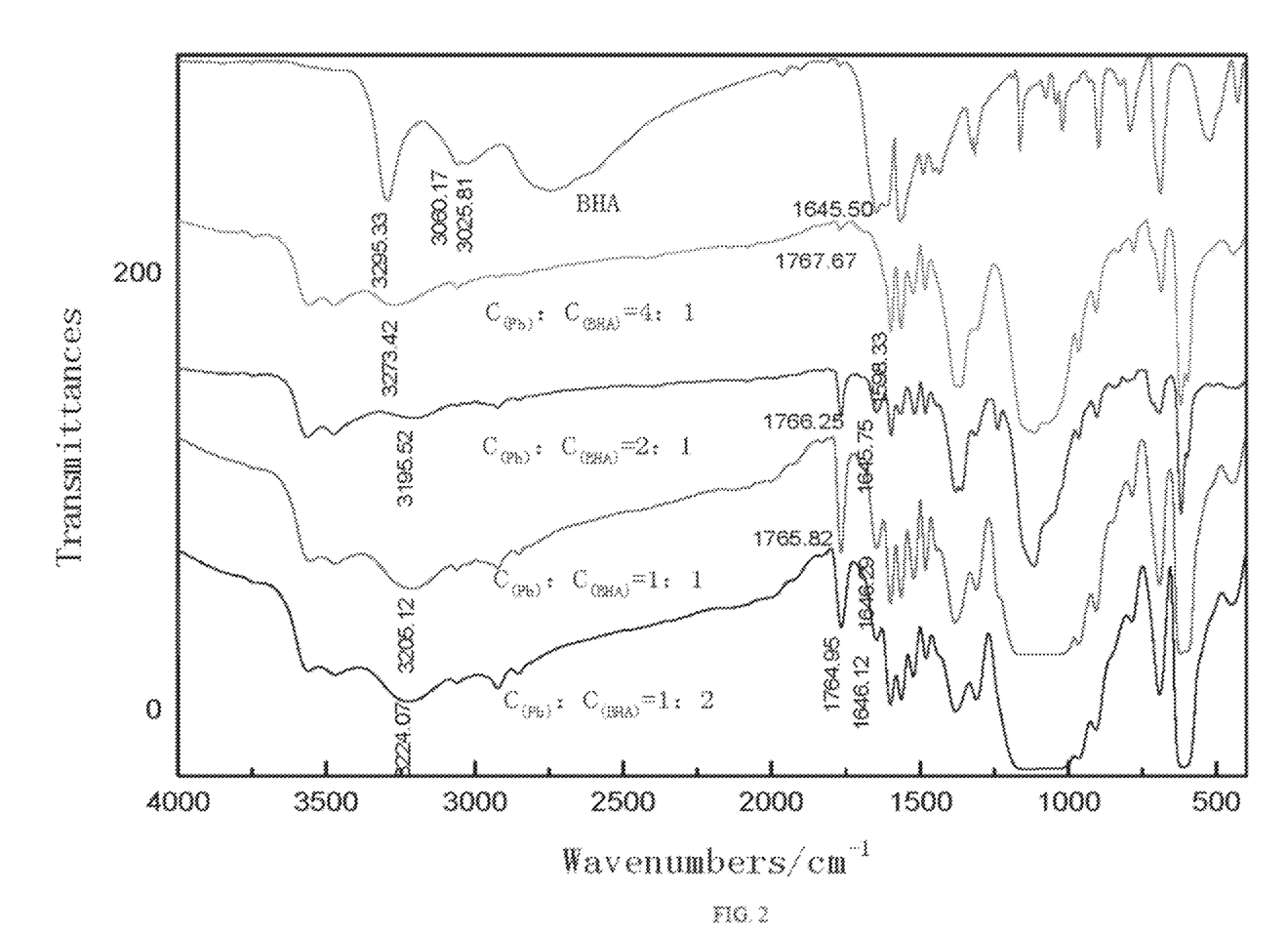
FIG. 2 is an infrared spectrogram of a benzohydroxamic acid-lead hydroxide coordination complex prepared according to Embodiments 2-5 and benzohydroxamic acid.

An infrared spectrogram of a benzohydroxamic acid-lead hydroxide coordination complex (Pb-BHA) prepared according to Embodiments 2-5 and benzohydroxamic acid (BHA) is shown in FIG. 2. Absorption peaks of the BHA were 3295 $cm^{-1}$ and 3060.17 $cm^{-1}$, and these might be telescopic vibration absorption peaks of O—H and N—H. A broadband about 2747.24 $cm^{-1}$ was an intramolecular O—H—O extension band of the BHA. IR spectrum comparison of the Pb-BHA and the BHA showed that disappearance or decrease of the broadband (intramolecular O—H—O extension band) in a 2700 $cm^{-1}$ position and broadband position movement were caused by loss of OH in CO—NHOH. Meanwhile, a feature peak of O—H in a 3295.33 position also disappeared, and some new peaks of 3200 $cm^{-1}$ to 3600 $cm^{-1}$ were generated, it might be Fermi resonance of O—H induced by the Pb-BHA. C—O or C═N peaks in a 1665.50 $cm^{-1}$ position were separated, movement was performed in the complex to a certain degree, and it showed that the ligand performed coordination through O or N. In a region of 550-630 cm-1, two (or more) strong absorption peaks of the Pb-BHA were v (Pb—O or Pb—N). A plurality of Pb—O or Pb—N bands existed. This was more obvious on a mixed ligand complex. Different Pb—O or Pb—N bond lengths were reflected. It could be predicted that most Pb-BHA coordination complexes would exist in a form of C═O and Pb—O to form stable five-membered rings, because the BHA mainly used a sealed (hydrogen bonded) Z structure in a water solution.

Figure 3:
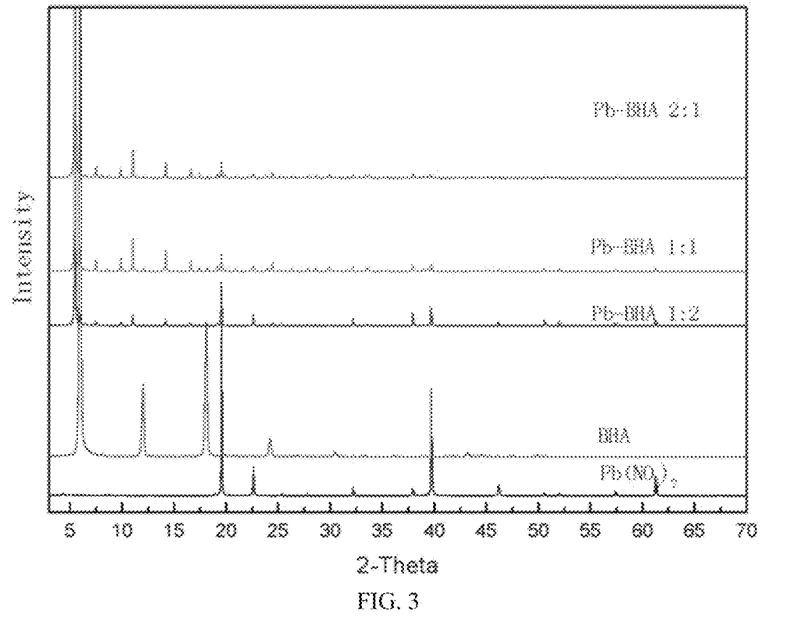
FIG. 3 is an XRD spectrogram of a benzohydroxamic acid-lead hydroxide coordination complex prepared according to Embodiments 3-5.

An XRD spectrogram of the Pb-BHA prepared according to Embodiments 3, 4, and 5 is shown in FIG. 3. FIG. 3 shows an XRD spectrogram of the Pb-BHA at different Pb/BHA rates. Feature peaks of the BHA and $Pb(NO_3)_2$ were not observed. Additionally, some strong peaks occurred in positions of 5.4578°, 11.0964°, and 12.2432°. It showed that new Pb-BHA types were generated. The peak intensities of the Pb-BHA complex are different from each other relative to the Pb/BHA rates. It was discovered that more than one stable complex was formed in a reaction between the BHA and $Pb^{2+}$.

Figure 4:
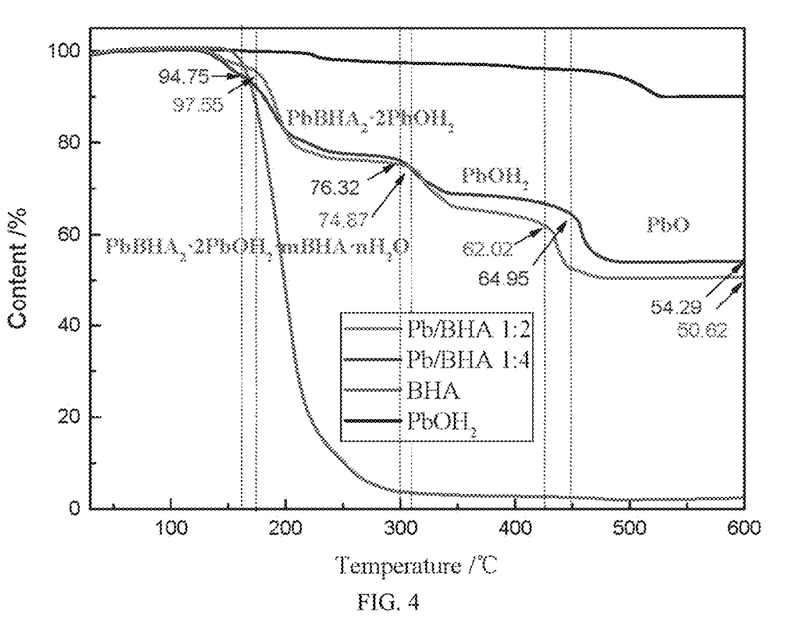
FIG. 4 is a thermogravimetric analysis (TGA) spectrogram of a benzohydroxamic acid-lead hydroxide coordination complex prepared according to Embodiments 5-6.

A thermogravimetric analysis (TGA) spectrogram of the Pb-BHA prepared according to Embodiments 5 and 6 is shown in FIG. 4. A molecular structure of the Pb-BHA coordination complex is $PbBHA_2·2Pb(OH)_2$ or $Pb_3(OH)_4BHA_2$. FIG. 4 is thermogravimetric analysis of the Pb-BHA in a temperature rise process of 30° C. to 600° C. It showed that Pb-BHA precipitates went through three stages. In the first stage (30-300° C.), the weight of the Pb-BHA was reduced through evaporation of water (such as free water and crystal water) and decomposition of absorbed BHA molecules. In the second stage (300-450° C.), exothermic decomposition peaks were prominent, and $Pb(BHA)_2·xPb(OH)_2$ started to be decomposed into $Pb(OH)_2$. In the third stage (450-600° C.), the $Pb(OH)_2$ was decomposed into PbO. The reaction might be concluded as follows:

According to weight loss at each stage, a structure of the Pb-BHA might be predicated into $2Pb(OH)_2·Pb(BHA)_2·mBHA·nH_2O$. A most stable structure might be $2Pb(OH)_2·Pb(BHA)_2$. BHA molecules might be adsorbed onto the structure through hydrogen bonds.

Embodiment 12

After Shizhuyuan wolframite and scheelite mixed ore in Hunan (containing a small amount of tungstite) was subjected to crushing, ore grinding, magnetic separation deferrization, and desulfurization, a pH regulator was added into desulfurization tailings to regulate the pH value of ore pulp to 9.6. Then, the benzohydroxamic acid-lead hydroxide coordination complex prepared according to Embodiment 1 was added for stirring and pulp conditioning. A terpenic oil foaming agent was added for inflation floatation. A foam product was a tungsten concentrate. An addition amount of the benzohydroxamic acid-lead hydroxide coordination complex relative to the raw ore was 400 g/t, and an addition amount of the foaming agent was 5 g/t. The pH regulator was sodium carbonate. The floatation temperature was 25° C. During concentration operation, water glass and aluminum sulfate were added to be used as inhibitors. A wolframite and scheelite mixed concentrate with the concentrate $WO_3$ grade of 12.63% was obtained through one roughing and two concentrations. A recovery rate was 82.58% (as shown in Table 1).

Table 1 Whole-Flow-Process Closed-Circuit Test Result of New Tungsten Separation Process of Desulfurization Tailings

TABLE 1

| Product name | Yield (%) | $WO_3$ grade (%) | $CaF_2$ grade (%) | Sn grade (%) | $CaCO_3$ grade (%) | $WO_3$ recovery rate (%) | $CaF_2$ recovery rate (%) | Sn recovery rate (%) | $CaCO_3$ recovery rate (%) |
|---|---|---|---|---|---|---|---|---|---|
| Tungsten concentrate | 2.56 | 12.63 | 12.66 | 1.08 | 14.58 | 82.58 | 1.53 | 31.05 | 4.67 |
| Tailings | 97.44 | 0.07 | 21.37 | 0.11 | 7.82 | 17.42 | 98.47 | 68.95 | 95.33 |
| Feeding | 100.0 | 0.39 | 21.15 | 0.14 | 7.99 | 100 | 100 | 100 | 100 |

Embodiment 13

Figure 5:
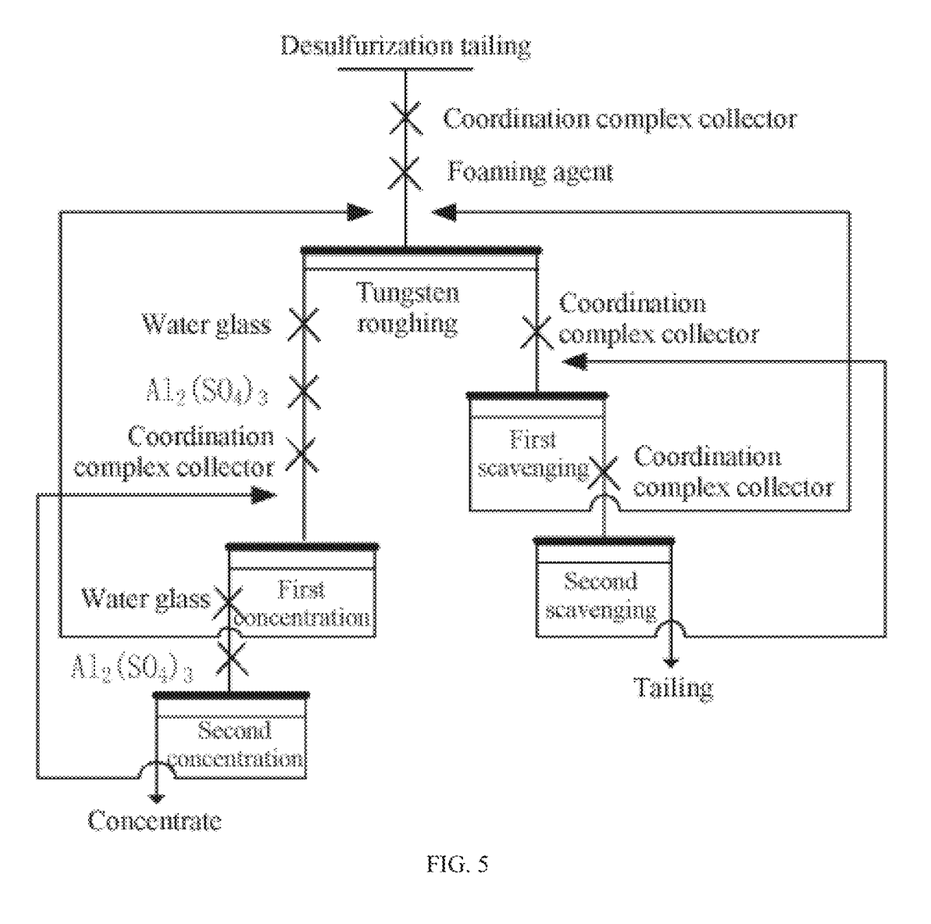
FIG. 5 is a flow diagram of a desulfurization tailing tungsten separation process of using a benzohydroxamic acid-lead hydroxide coordination complex according to Embodiment 13 as a collector.

After Chaishan single scheelite ore in Hunan was subjected to crushing, ore grinding, magnetic separation deferrization, and desulfurization, a pH regulator was added into desulfurization tailings to regulate the pH value of ore pulp to 9.6. Then, the benzohydroxamic acid-metal hydroxide coordination complex prepared according to Embodiment 1 was added for stirring and pulp conditioning. A terpenic oil foaming agent was added for inflation floatation. A foam product was a tungsten concentrate. An addition amount of the collector relative to the raw ore was 300 g/t, and an addition amount of the foaming agent was 5 g/t. The pH regulator was sodium carbonate. The floatation temperature was 25° C. During concentration operation, water glass and aluminum sulfate were added to be used as inhibitors. A scheelite concentrate with the concentrate $WO_3$ grade of 16.43% was obtained through one roughing and two concentrations. A recovery rate was 92.64% (the floatation process flow process was as shown in FIG. 5).

Table 2 Whole-Flow-Process Closed-Circuit Test Result of New Tungsten Separation Process of Desulfurization Tailings

TABLE 2

Table 2
Whole-flow-process closed-circuit test result
of new tungsten separation process of desulfurization tailings

| Product name | Yield/% | $WO_3$ grade/% | $WO_3$ recovery rate/% |
|---|---|---|---|
| Tungsten concentrate | 1.51 | 16.43 | 92.64 |
| Tailings | 98.49 | 0.02 | 7.36 |
| Feeding | 100.00 | 0.27 | 100.00 |

Embodiment 14

Figure 6:
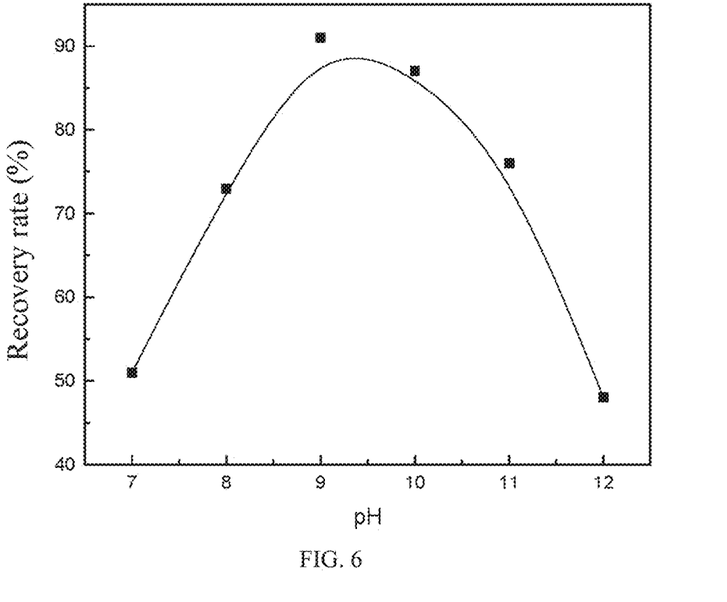
FIG. 6 is influence of a pH value of ore pulp on floatability of scheelite when a benzohydroxamic acid-lead hydroxide coordination complex prepared according to Embodiment 1 is used as a collector.

Operation steps were identical to those in Embodiment 13. Floatation effects of the benzohydroxamic acid-lead hydroxide coordination complex prepared according to Embodiment 7 on the scheelite under a condition of different pH values were investigated. The floatation effects are as shown in FIG. 6. It shows that under the alkaline condition, the floatation effect of benzohydroxamic acid-metal hydroxide on the scheelite is better, and the effect is particularly prominent when the pH value is 8-10.

Embodiment 15

Figure 7:
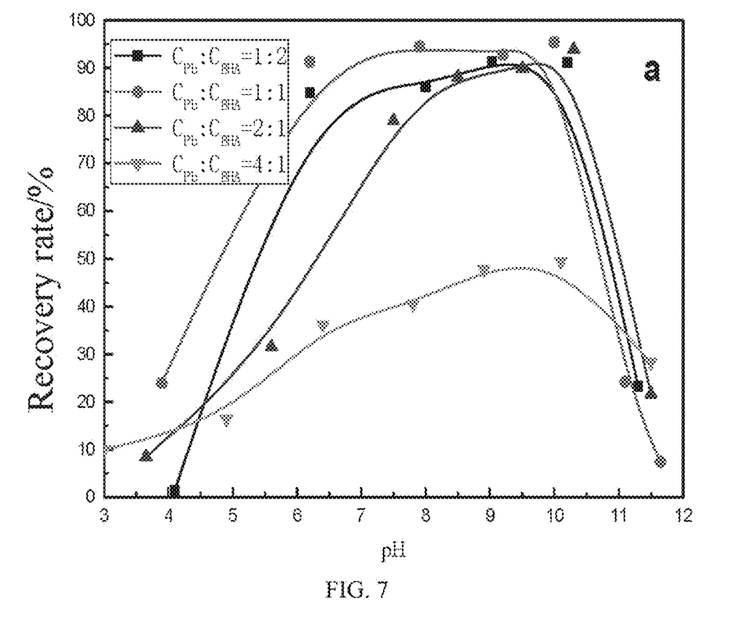
FIG. 7 is influence of a pH value of ore pulp on floatability of scheelite when a benzohydroxamic acid-lead hydroxide coordination complex prepared according to Embodiments 2-5 is used as a collector.

Operation steps were identical to those in Embodiment 13. Benzohydroxamic acid-lead hydroxide coordination complexes in Embodiments 2-5 were respectively used. Floatation effects of these coordination complex collectors on the scheelite under a condition of different pH values were investigated. The floatation effects are as shown in FIG. 7. From the figure, it can be seen that the benzohydroxamic acid-lead hydroxide coordination complexes with the pH value of 3-12 had floatation effects on the scheelite, and the floatation effects were better under the alkaline condition, such as a pH of 7-10.

Control experiment group: operation steps were identical to those in Embodiment 13. Benzohydroxamic acid-lead hydroxide coordination complexes in Embodiments 2-5 were respectively used. Floatation effects of these coordination complex collectors on the fluorite ore under a condition of different pH values were investigated. The floatation effects are as shown in FIG. 13.

Through the control experiment group, it can be seen that the selectivity ability of the benzohydroxamic acid-lead hydroxide coordination complexes on the scheelite under the alkaline condition is much higher than that of calcium-containing minerals such as fluorite. Efficient separation of the scheelite from the minerals such as fluorite can be realized.

Embodiment 16

Figure 8:
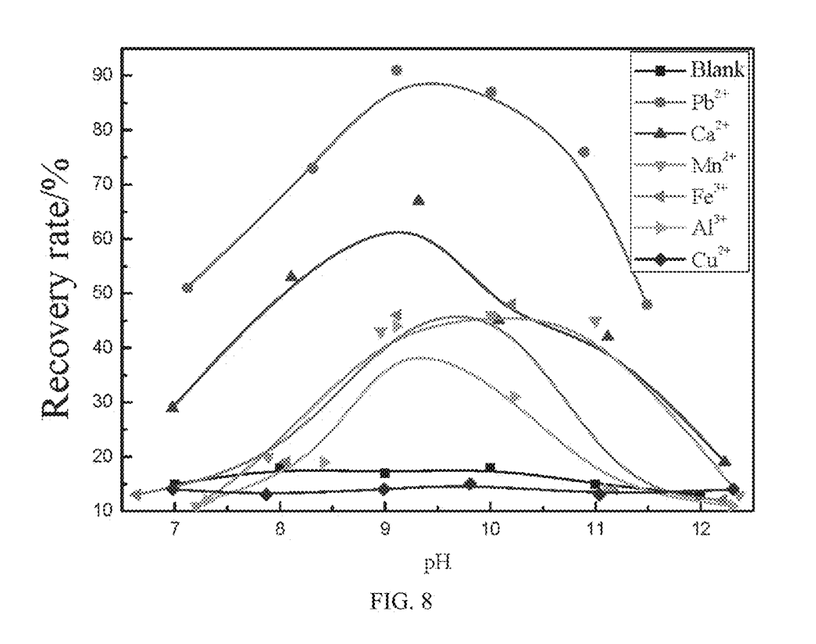
FIG. 8 is influence of a pH value of ore pulp on floatability of scheelite when a benzohydroxamic acid-metal hydroxide coordination complex prepared according to Embodiment 8 is used as a collector.

Operation steps were identical to those in Embodiment 13. Various benzohydroxamic acid-metal hydroxide coordination complexes in Embodiments 8 were respectively used. Floatation effects on the scheelite under a condition of different pH values were investigated. The floatation effects are as shown in FIG. 8. From FIG. 8, it can be seen that hydroxamic acid-lead complexes formed by divalent lead ions showed better selectivity and strong collection ability on the floatation collection of the scheelite through being compared with hydroxamic acid-metal hydroxide coordination complexes formed by other metal ions such as $Ca^{2+}$, $Mn^{2+}$, $Cu^{2+}$, $Fe^{3+}$, and $Al^{3+}$. As $Pb^{2+}$ is better than $Ca^{2+}$, $Ca^{2+}$ is better than $Mn^{2+}$, $Fe^{3+}$ and $Al^{3+}$, and $Mn^{2+}$, $Fe^{3+}$ and $Al^{3+}$ are better than $Cu^{2+}$, the metal ions were most preferably $Pb^{2+}$.

Embodiment 17

Figure 9:
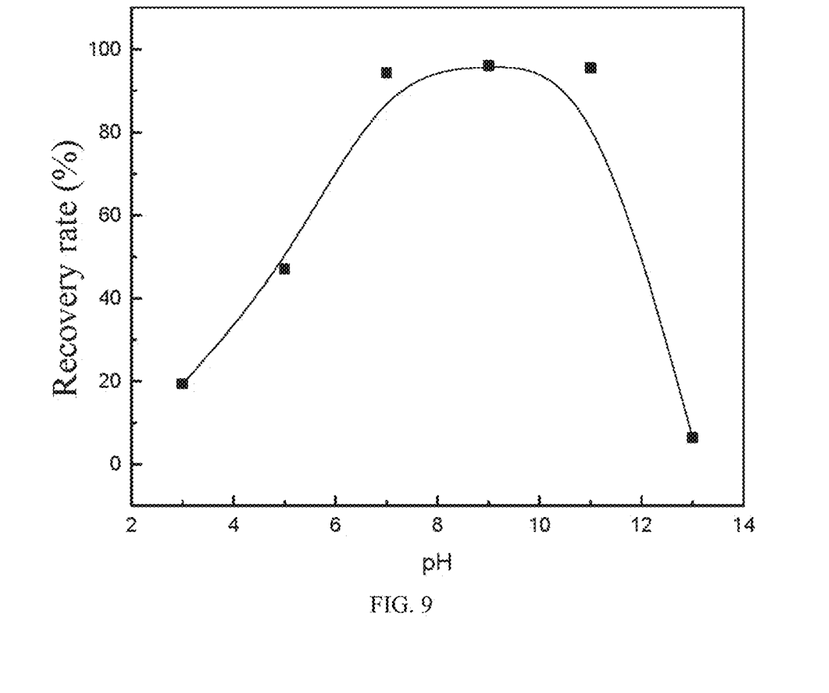
FIG. 9 is influence of a pH value of ore pulp on floatability of scheelite when a salicyl hydroxamic acid-lead hydroxide coordination complex is used as a collector.
Figure 10:
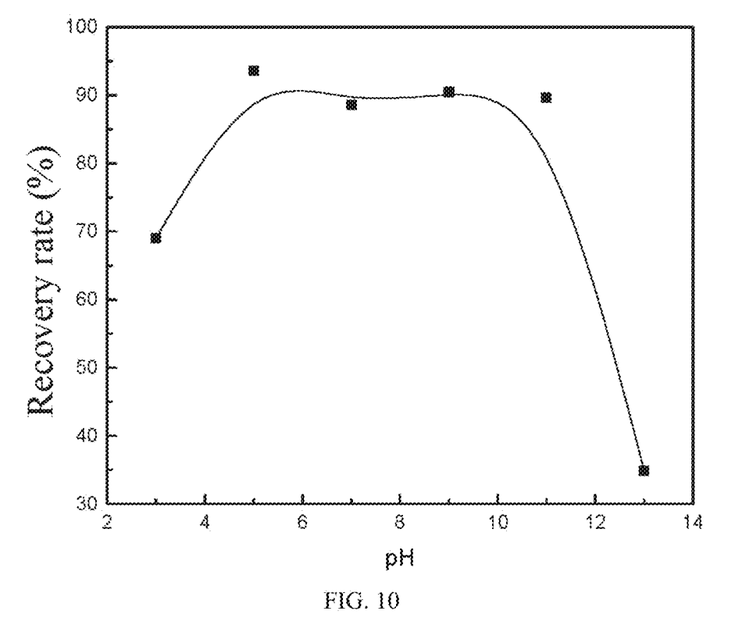
FIG. 10 is influence of a pH value of ore pulp on floatability of scheelite when an octyl hydroxamic acid-lead hydroxide coordination complex is used as a collector.
Figure 11:
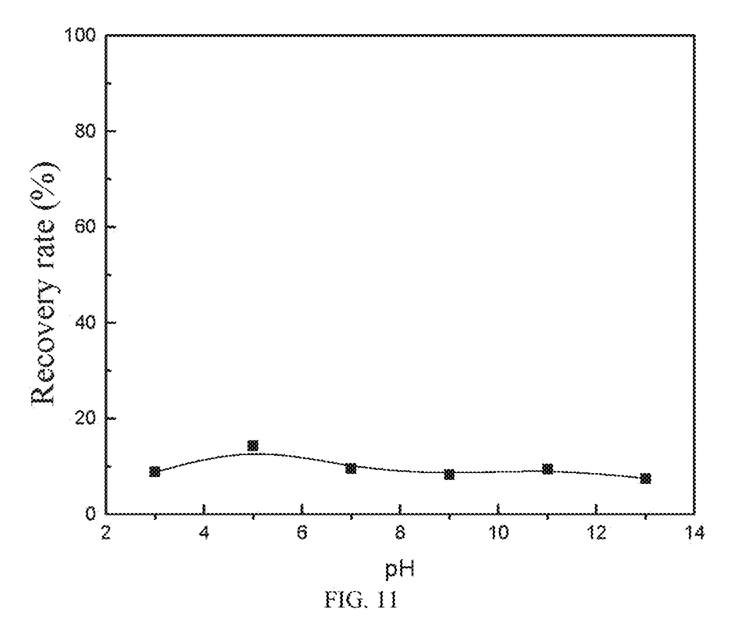
FIG. 11 is influence of a pH value of ore pulp on floatability of scheelite when an acetohydroxamic acid-lead hydroxide coordination complex is used as a collector.
Figure 12:
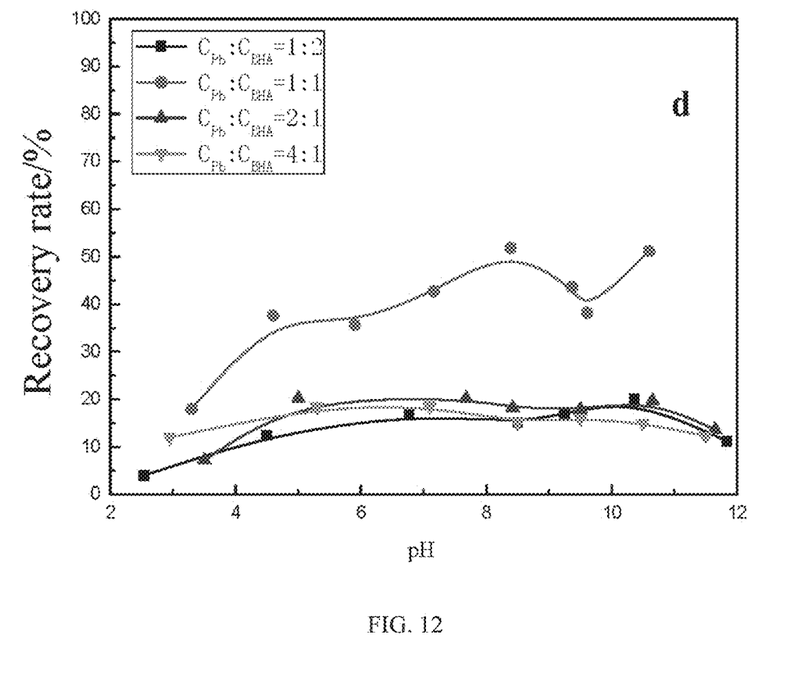
FIG. 12 is influence of a pH value of ore pulp on floatability of fluorite ore when a benzohydroxamic acid-lead hydroxide coordination complex prepared according to Embodiments 2-5 is used as a collector.

Operation steps were identical to those in Embodiment 13. Various hydroxamic acid-lead hydroxide coordination complexes in Embodiments 9-11 were respectively used. Floatation effects on the scheelite under a condition of different pH values were investigated. The floatation effects are as shown in FIG. 9-11. From the figures, it can be seen that under the same conditions, the floatation effects on the scheelite when the hydroxamic acid-lead hydroxide coordination complexes prepared from benzohydroxamic acid, salicyl hydroxamic acid, and octyl hydroxamic acid were used as collectors were higher than those of acetohydroxamic acid-lead hydroxide coordination complexes.

Embodiment 18

After Wenshan fine particle tin ore in Yunnan was subjected to crushing, ore grinding, magnetic separation deferrization, and desulfurization, a pH regulator was added into desulfurization tailings to regulate the pH value of ore pulp to 8.5. Then, the benzohydroxamic acid-metal hydroxide coordination complex prepared according to Embodiment 1 was added for stirring and pulp conditioning. An octanol foaming agent was added for inflation floatation. A foam product was a tin concentrate. An addition amount of the collector relative to the raw ore was 400 g/t, and an addition amount of the foaming agent was 10 g/t. The pH regulator was sodium carbonate. The floatation temperature was 25° C. During concentration operation, 50 g/t of carboxymethylcellulose was added to be used as an inhibitor. A tin concentrate with the concentrate $SnO_2$ grade of 40.15% was obtained through one roughing and three concentrations. A recovery rate was 83.89%.

Table 3 Whole-Flow-Process Closed-Circuit Test Result of New Cassiterite Floatation Process of Desulfurization Tailings

TABLE 3

Table 3
Whole-flow-process closed-circuit test result
of new cassiterite floatation process of desulfurization tailings

| Product | Yield/% | SnO$_2$/% | SnO$_2$ recovery rate/% |
|---|---|---|---|
| Tin concentrate | 0.90 | 40.15 | 83.89 |
| Tailings | 99.10 | 0.07 | 16.11 |
| Feeding | 100.00 | 0.43 | 100.00 |

Embodiment 19

Panzhihua fine particle ilmenite in Sichuan was treated by this process method. A pH regulator was added into desulfurization tailings to regulate a pH value of ore pulp to 5.6. Then, the benzohydroxamic acid-metal hydroxide coordination complex prepared according to Embodiment 1 was added for stirring and pulp conditioning. An octanol foaming agent was added for inflation floatation. A foam product was an ilmenite concentrate. An addition amount of the collector relative to the raw ore was 600 g/t, and an addition amount of the foaming agent was 10 g/t. The pH regulator was sulfuric acid. The floatation temperature was 25° C. During concentration operation, 100 g/t of acidified water glass was added to be used as an inhibitor. An ilmenite concentrate with the grade of 49.80% was obtained through one roughing and three concentrations. A recovery rate was 67.93%.

Table 4 Whole-Flow-Process Closed-Circuit Test Result of New Ilmenite Floatation Process of Desulfurization Tailings

TABLE 4

Table 4
Whole-flow-process closed-circuit test result
of new ilmenite floatation process of desulfurization tailings

| Product | Yield/% | TiO$_2$ grade/% | TiO$_2$ recovery rate/% |
|---|---|---|---|
| Ilmenite concentrate | 28.15 | 49.80 | 67.93 |
| Tailings | 71.85 | 9.21 | 32.07 |
| Feeding | 100.00 | 20.64 | 100.00 |

Embodiment 20

Baotou heavy rare earth ore was treated by this process method. A pH value of raw ore was regulated by a pH regulator to 8.0. Then, the benzohydroxamic acid-metal hydroxide coordination complex prepared according to Embodiment 1 was added for stirring and pulp conditioning. An octanol foaming agent was added for inflation floatation. A foam product was a heavy rare earth concentrate. An addition amount of a metal ion coordination complex collector relative to the raw ore was 300 g/t, and an addition amount of the foaming agent was 10 g/t. The pH regulator was sodium carbonate. The floatation temperature was 25° C. During concentration operation, 150 g/t of acidified water glass was added to be used as an inhibitor. A heavy rare earth concentrate with the coarse concentrate grade of 52.24% was obtained through one roughing and four concentrations. A recovery rate was 53.68%.

Table 5 Whole-Flow-Process Closed-Circuit Test Result of New Heavy Rare Earth Floatation Process

TABLE 5

Table 5
Whole-flow-process closed-circuit
test result of new heavy rare earth floatation process

| Product | Yield/% | Grade(REO)/% | Yield/% |
|---|---|---|---|
| Heavy rare earth concentrate | 6.57 | 52.24 | 53.68 |
| Tailings | 93.43 | 3.17 | 46.32 |
| Feeding | 100.00 | 6.39 | 100.00 |

Embodiment 21

Hubei low-grade rutile ore was treated by this process method. Raw ore was subjected to crushing and ore grinding. Then, a pH regulator was added for regulating a pH value of ore pulp to 5.0. Then, the benzohydroxamic acid-metal hydroxide coordination complex prepared according to Embodiment 1 was added for stirring and pulp conditioning. An octanol foaming agent was added for inflation floatation. A foam product was a rutile concentrate. An addition amount of a collector relative to the raw ore was 400 g/t, and an addition amount of the foaming agent was 10 g/t. The pH regulator was sulfuric acid. The floatation temperature was 25° C. During concentration operation, 100 g/t of acidified water glass was added to be used as an inhibitor. A rutile concentrate with the grade of 63.70% was obtained through one roughing and three concentrations. A recovery rate was 81.09%.

Table 6 Whole-Flow-Process Closed-Circuit Test Result of New Rutile Floatation Process

TABLE 6

Table 6
Whole-flow-process closed-circuit
test result of new rutile floatation process

| Product | Yield/% | TiO$_2$ grade/% | TiO$_2$ recovery rate/% |
|---|---|---|---|
| Rutile concentrate | 2.94 | 63.70 | 81.09 |
| Tailings | 97.06 | 0.45 | 18.91 |
| Feeding | 100.00 | 2.31 | 100.00 |

What is claimed is:

1. A preparation method of a hydroxamic acid-metal hydroxide coordination complex, comprising: performing a coordination reaction between hydroxamic acid and divalent or higher valent metal ions in an alkaline solution system to obtain the hydroxamic acid-metal hydroxide coordination complex; wherein
the hydroxamic acid has a structure of formula 1, and the formula 1 is expressed as:

wherein R is a hydrophobic organic group, wherein after the coordination reaction is completed, the hydroxamic acid-metal hydroxide coordination complex is separated and purified by a carrier adsorption-foam floatation method.

2. The preparation method according to claim 1, wherein R is an aliphatic hydrocarbon radical or an aryl.

3. The preparation method according to claim 2, wherein R is a $C_4$-$C_{12}$ alkyl, a $C_4$-$C_{12}$ unsaturated aliphatic hydrocarbon radical, phenyl, or substituted phenyl.

4. The preparation method according to claim 3, wherein R is the phenyl.

5. The preparation method according to claim 1, wherein the divalent or higher valent metal ions comprise at least one of $Pb^{2+}$, $Ca^{2+}$, $Mn^{2+}$, $Cu^{2+}$, $Fe^{3+}$, and $Al^{3+}$.

6. The preparation method according to claim 5, wherein the divalent metal ions are $Pb^{2+}$.

7. The preparation method according to claim 1, wherein a coordination mole ratio of the divalent or higher valent metal ions to the hydroxamic acid is (1-4):(1-5).

8. The preparation method according to claim 7, wherein the coordination mole ratio of the divalent or higher valent metal ions to the hydroxamic acid is (1-2):(1-3).

9. The preparation method according to claim 1, wherein a pH value of the alkaline solution system is 8-11.

10. The preparation method according to claim 9, wherein the pH value of the alkaline solution system is 8.5-9.5.

11. The preparation method according to claim 1, wherein a temperature of the coordination reaction is 20-80° C., and a reaction time is 0.5-6 hours.

12. The preparation method according to claim 11, wherein the temperature of the coordination reaction is 55-65° C., and the reaction time is 1-2 hours.

13. The preparation method according to claim 1, wherein the carrier adsorption-foam floatation method comprises the steps of:
 adsorbing the hydroxamic acid-metal hydroxide coordination complex in a solution system by carrier particles;
 after the step of adsorbing is completed, recovering the carrier particles loading the hydroxamic acid-metal hydroxide coordination complex through a foam floatation; and
 obtaining a hydroxamic acid-metal coordination complex solution by an ultrasonic washing of the carrier particles loading the hydroxamic acid-metal hydroxide coordination complex.

14. The preparation method according to claim 13, wherein the carrier particles are quartz particles with a particle size of 10-37 μm.

15. The preparation method according to claim 13, wherein absolute ethyl alcohol is used as a washing agent for the ultrasonic washing.

* * * * *